United States Patent [19]
Kaestner

[11] 3,917,409
[45] *Nov. 4, 1975

[54] OPTICAL APPARATUS FOR DETERMINING FOCUS

[76] Inventor: Paul T. Kaestner, 246 Bay Ave., Huntington Bay, N.Y.

[ * ] Notice: The portion of the term of this patent subsequent to Sept. 4, 1990, has been disclaimed.

[22] Filed: June 26, 1972

[21] Appl. No.: 266,270

[52] U.S. Cl. .................. 356/125; 356/4; 356/169
[51] Int. Cl.² ..................... G01B 9/00; G01C 3/08
[58] Field of Search ........... 356/125, 124, 126, 153, 356/152, 169, 123, 4; 250/201

[56] References Cited
UNITED STATES PATENTS

| | | | |
|---|---|---|---|
| 2,524,807 | 10/1950 | Kallman | 356/4 |
| 3,318,650 | 5/1967 | Papp | 350/275 x |
| 3,348,050 | 10/1967 | Bez | 356/4 X |
| 3,447,874 | 6/1969 | Back | 356/124 |
| 3,506,839 | 4/1970 | Ando et al. | 356/4 |
| 3,554,653 | 1/1971 | Zielke et al. | 356/153 |
| 3,757,124 | 9/1973 | Kaestner | 356/122 X |

FOREIGN PATENTS OR APPLICATIONS

| | | | |
|---|---|---|---|
| 1,103,050 | 3/1961 | Germany | 356/126 |
| 644,711 | 10/1950 | United Kingdom | 356/125 |

OTHER PUBLICATIONS

"The Collimator for Marking Distance Scales on Camera Lenses" by Nabelek, et al., Microtecnic (Engl.) Vol. 14, No. 5, Oct. 1960, pp. 244–245.

Primary Examiner—Paul A. Sacher
Assistant Examiner—Conrad J. Clark
Attorney, Agent, or Firm—Stephen E. Feldman

[57] ABSTRACT

An apparatus for determining the focus of a lens. The apparatus includes a light beam generating means and means for providing an output signal which indicates the focus of the lens and/or its relation to the position of optimum focus for a lens for an optical system. The means for providing the output signal can be a cylindrical chopper or an oscillating grid. Preferably the light beam generating means and the chopper are positioned in the same physical structure.

13 Claims, 26 Drawing Figures

FIG. 11
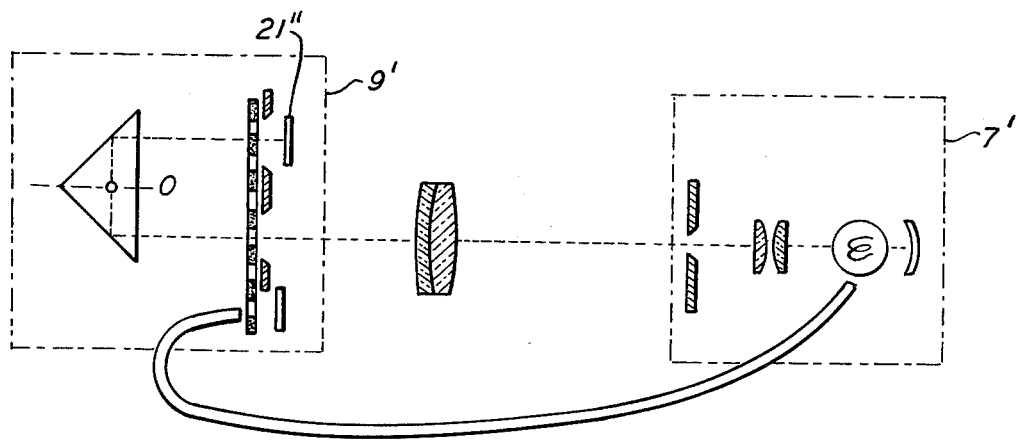
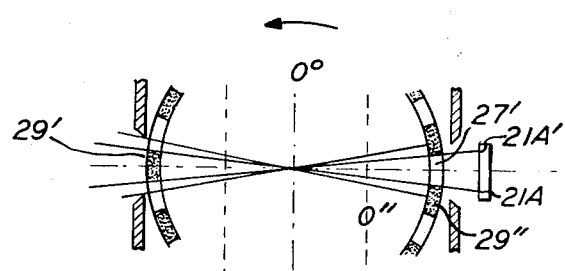
FIG. 3A
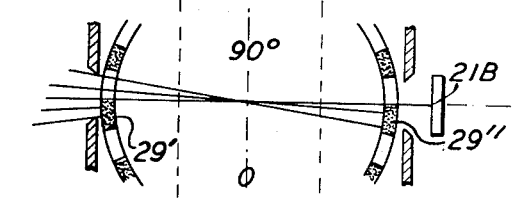
FIG. 3B
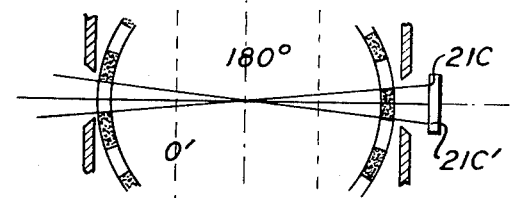
FIG. 3C
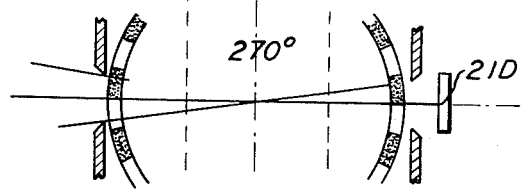
FIG. 3D

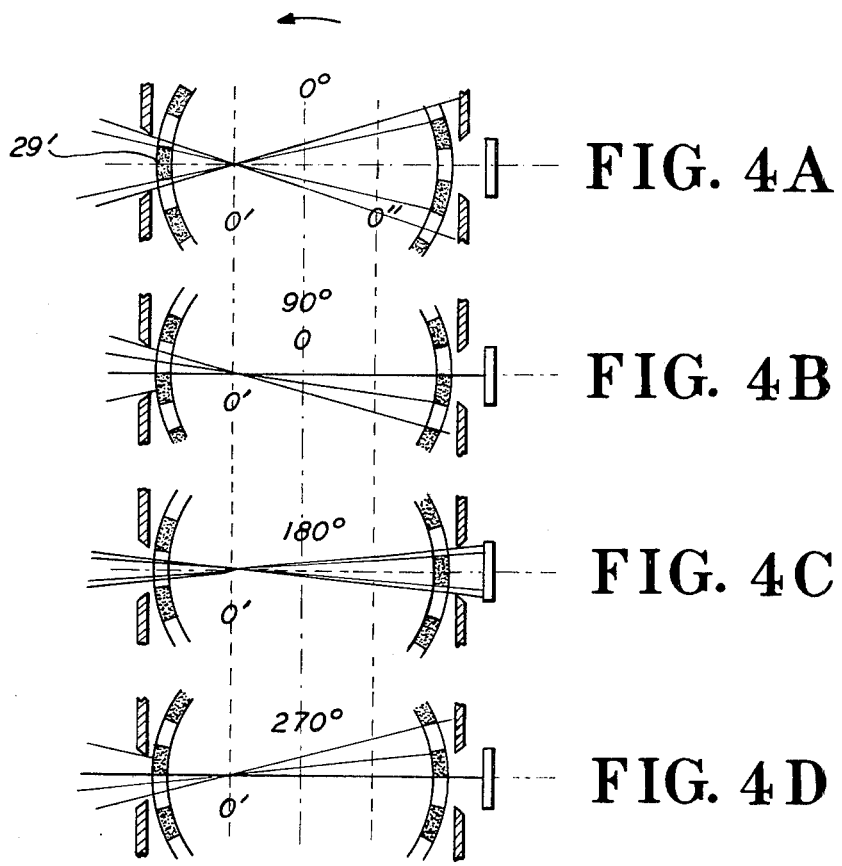
FIG. 4A
FIG. 4B
FIG. 4C
FIG. 4D
FIG. 5
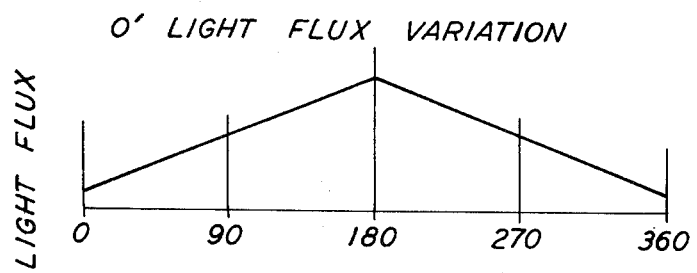

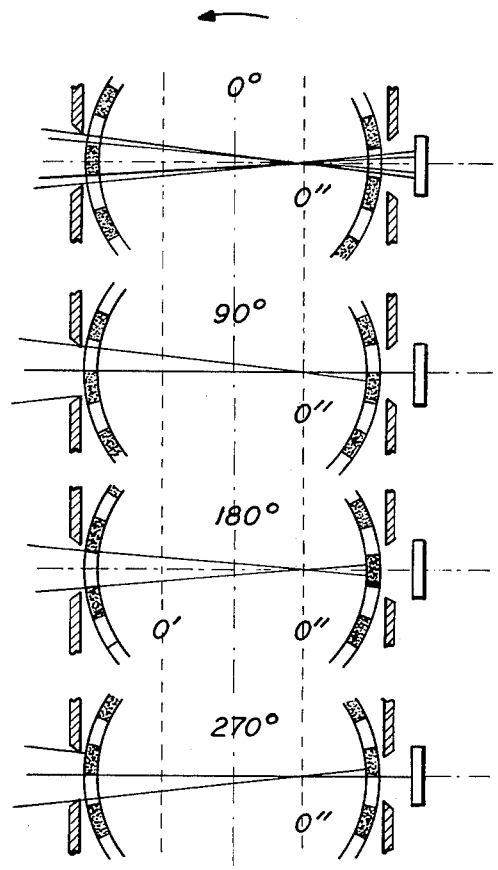
FIG. 6A
FIG. 6B
FIG. 6C
FIG. 6D
FIG. 7
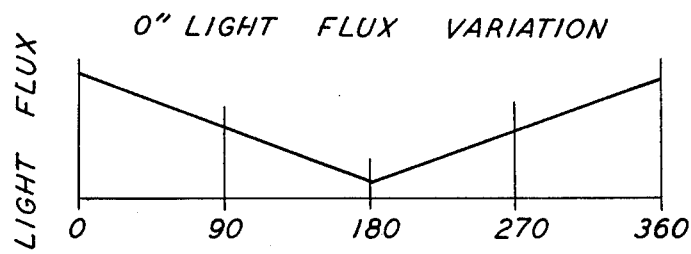

OPTICAL APPARATUS FOR DETERMINING FOCUS

BACKGROUND OF THE INVENTION

Determining optimum focus for an optical system has always been a particularly difficult task. Conventional practice has been to establish optimum focus visually.

When a condition of optimum focus in the image plane is determined by human eye, there is a constant problem of doubtful accuracy and poor repeatability. Moreover, visual focusing is a time consuming process.

Only one commercial system is known wherein the plane of sharpest focus is determined without depending directly on the human eye. This system is described on pages 18–21, of the May/June 1968 issue of OPTICAL SPECTRA wherein a light sensing probe is placed in the image plane of an optical system. The probe has an output to a recorder or the like. An element of the system is adjusted until the output of the probe is at maximum indicating maximum sharpness.

The problems with this system are:
1. It is subject to drift and needs constant calibration.
2. It does not provide indication of the sense of the error.
3. Its application is limited by slow response.

In applicants prior application U.S. Ser. No. 171,551 filed Aug. 13, 1971, now U.S. Pat. No. 3,757,124 entitled Optical Apparatus, a system is described which overcomes these problems. In that apparatus, the two principal parts; the light beam generating means and the means for generating an output signal are packaged in separate housings since they have to be positioned so that one is on either side of the image forming optics. It would be advantageous if these could be integrated in the same housing so that they could be permanently positioned with respect to each other and positioned on the same side of the image forming optics.

SUMMARY OF THE INVENTION

An apparatus for determining the exact focus for a lens and/or the accurate focal length of a lens in an optical system is described. A light beam produced by a slit source, directed through the optical elements passes through a means for generating an output signal which is then compared with a reference signal to determine the location and/or focus of the lens. This latter means can either be an oscillating grid or an oscillating or rotating chopper. The means for generating the light beam and the chopper or grid are enclosed in the same structural housing and positioned on one side of the image forming optics.

BRIEF DESCRIPTION OF THE PRESENT INVENTION

The present invention provides a signal generating system including a sensor for converting light into an electric signal. When the image of an illuminated slit is produced in a certain location, a uniform light flux is produced on the photosensor. In this condition, the signal generating means produces a null. Shift of the slit image from the location produces a fluctuating light flux at the sensor having a phase characteristic which depends on whether the image is fore of aft of its desired location.

In response to the fluctuating light, a signal is produced having a phase corresponding to the position of the image. This signal is compared with a reference signal, producing an output signal indicating the direction for corrective action. The output signal can be used as an error signal for servo control of lens, mirror or other element in an optical system which controls the place of focus of the slit image. A high frequency output signal can be produced by rotating or oscillating the chopper, or oscillating the grid at high speed thereby producing high frequency signal input to the servo system to provide rapid response.

DESCRIPTION OF THE DRAWINGS

FIGS. 3A, 3B, 3C and 3D show the chopper of FIG. 1 in successive rotational positions with light passing through the chopper when the light image is focused at the center of the chopper.

FIGS. 4A, 4B, 4C, and 4D are views similar to FIGS. 3A, 3B, 3C and 3D except that the image is focused short of the center of the chopper.

FIG. 5 is a graph illustrating the variation in light flux through one of the repeated light flux patterns generated when the light image is positioned as in the FIG. 4 and 9 series.

FIGS. 6A, 6B, 6C and 6D are also views similar to FIGS. 3A, 3B, 3C and 3D except that the image is focused aft of the center of the chopper.

FIG. 7 is a graph similar to the graph of FIG. 5 of light flux variation, except that it shows a phase shift of 180° due to the light image appearing aft of center as in FIG. 6 and FIG. 10 series.

FIG. 11 is a schematic of another arrangement of the invention of FIG. 2 in which the receiver and transmitter are positioned separately.

PREFERRED EMBODIMENT OF THE INVENTION

Figure 1:
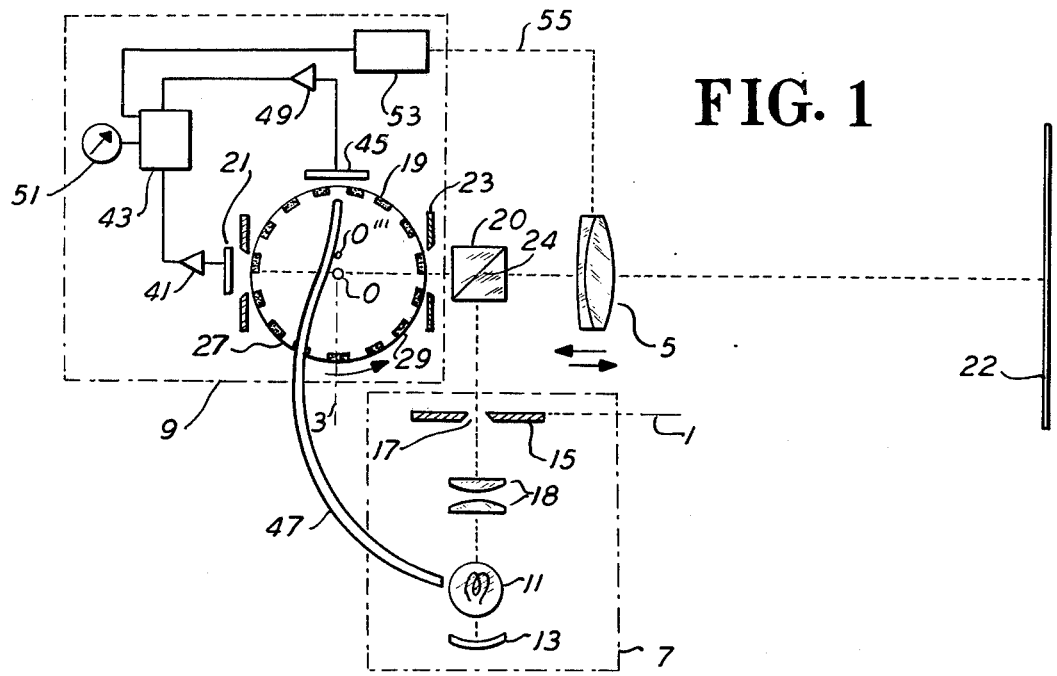
FIG. 1 is a schematic plan diagram of the present invention using a cylindrical chopper.

Referring to FIG. 1, the invention is illustrated as applied to an optical system including an object plane 1, a target image plane 3, and a lens 5. Lens 5 is to be positioned relative to planes 1 and 3 so as to focus an object in object plane 1 in the image plane 3.

In order to properly position lens 5, the present invention includes a transmitter 7 and a receiver 9 both of which are fixed relative to each other and relative to the known object and image planes 1 and 3, preferably equidistant from a beam splitter 20 hereinafter described.

Transmitter 7 includes a light source 11, a reflector 13 for the light source, and light shield 15 defining a slit 17. A condensing lens 18 concentrates light from source 11 through slit 17. The light shield 15 is aligned with the known object plane of the optical system 1.

Receiver 9 includes a rotary chopper 19 and photoelectric sensor 21. Axis 0 of chopper 19 lies in the known image plane 3 of the optical system being focused. When lens 5 is properly adjusted, a slit image of the illuminated slit 17 should be at 0 in image plane 3.

As hereinafter more particularly described, when the slit image lies in image plane 3, a flux variation of negligible magnitude is received by sensor 21 and a null signal is produced by a signal generating system, hereinafter described, thereby indicating that lens 5 is properly positioned. When the slit image lies fore or aft of the central axis 0, e.g. at 0' and 0'', then sensor 21 detects a fluctuating light flux with a 180° phase shift corresponding to whether the slit image is fore or aft the center 0 of chopper 19.

In order to place the receiver in the same unit as the transmitter for convenience and also so that their positions can be set with respect to each other, a light beam splitter 20 and mirror 22 or other means has to be provided to permit the light beam to pass out of transmitter 7 and pass back into the receiver 9.

The beam splitter may consist of a glass cube comprised of two isosceles right triangular prisms having a partially reflecting surface (a coating of reflecting material which is thinner than normally used for mirrors; it is similar to that used on one way mirrors). The coating is placed on the common hypoteneuse 24 of the prisms. Alternatively, the beam splitter may consist of a pellicle (a thin flat plastic membrane which is stretched over a flat frame and is coated with a partially reflecting coating). Either configuration transmits part of the light flux and reflects part of it.

The mirror 22 consists of an ordinary reflecting surface, (such as a silvered glass) and is positioned so that it is in a plane which is perpendicular to the light beam emitted from the light source and aligned with the beam splitter, the chopper and the lens.

Light from the light source then passes through slit 17 and falls on reflecting surface 24 of beam splitter 20. The light beam will then split with about half of the light passing straight through the beam splitter (this can be ignored since it has no effect on the operation), and about half of the light being reflected from the surface 24 and passing through lens 5.

This light will pass through the lens and hit mirror 22. The light passes through the lens in one of two ways. If the lens is positioned at a distance from the slit that is equal to the focal length of the lens, the light passing through the lens will be collimated thereon; that is, the light rays will be parallel since the lens will be focused at infinity. These light rays, after impinging on mirror 22, (which is perpendicular to the optical axis of the lens) pass through the lens again whereupon the collimated light is converted to image forming light by the lens. The other way that lens 5 can be positioned is where the distance between the slit and the lens is greater than the focal length of the lens. In this case a real image may be formed on the surface of mirror 22. The light returning from the mirror surface which is diverging is then converted to a converging or image forming light by lens 5.

In both of the above cases, about half the returning light is transmitted through the beam splitter and passes into the rotating chopper. The other half of the light is reflected by the mirrored surface in the beam splitter towards the light source, however, this light can be ignored since this does not affect the operation of the device.

For the case where a real image is formed on surface 22, it is not a prerequisite that the surface 22 be specular, it is only necessary that sufficient light energy is returned to lens 5. However, for the case where the lens is focused at infinity (the light rays are parallel) its surface must be specular so that the light beam returning from the mirror will be collimated (parallel rays) as is the light beam that hit the mirror. It must be collimated since the image is eventually formed in the chopper by the light returning through the lens from the mirror.

It is important to note that by the use of a beam splitter which is placed on axes for both light from the light source and light reflected back to the sensor, the position of the image at the chopper is doubly sensitive to improper focus shifts. The slightest displacement of the lens from the proper axial position will cause a shift in the focus of the light travelling through the lens not only in one direction but in both directions, thus accentuating the error. This makes detection much easier. By having the light beam pass through the same portion (optical aperture) of the lens in both directions the light beams will be affected by the lens in the same manner in both directions and therefore a more accurate reading of the lens can be taken. If the light beam passed through different positions of the lens in each direction it would be difficult to determine the characteristics of the lens because each of these two portions could have different characteristics and the characteristics could not be separated to determine which belonged to which portion of the lens. Further, the concentric arrangement of the elements made possible by the use of the beam splitter permits the optical elements to be realigned longitudinally (shifted) on the optical axis without need to readjust the entire mechanism.

Light shields 23 and 25 are provided for limiting the angles of convergence to and divergence from the slit image at the center 0 of the chopper 19.

Chopper 19 comprises a tubular member have a plurality of slots 27 and bars 29, odd in number and extending along the height thereof. As hereinafter explained, the odd number of slots 27 and bars 29 produce the phase shift hereinbefore referred to. Each bar 29 is diametrically opposite a slot 27. The bars 29 are of uniform width and slots 27 are of uniform width. As illustrated, width of slots 27 is equal the width of bars 29 but this is not a requirement.

While not illustrated, the chopper 19 can be made with an even number of slots but, in this instance, the central axis 0 of the chopper would have to be displaced from the optical axis, as e.g., at 0''' (see FIG. 1). Since this arrangement substantially adds to the complexity of the system, it is not considered to be the preferred embodiment of the invention. Chopper 19 is adapted to be rotated by any conventional drive means (not shown) at a uniform speed. The speed will govern frequency of the pickup by sensor 21 enabling a high frequency input to a servo control.

As hereinbefore described, the output of sensor 21 is phase shifted 180° depending on whether the slit image is located fore e.g. 0', or aft, e.g. 0'' of the center 0 of chopper 19 in image plane 3.

In order to illustrate the foregoing phase shift, FIGS. 3, 4, and 6 illustrate a succession of rotational positions of chopper 19. An angular rotation equivalent to the angular width of one slot and one bar is one cycle of the repeating light flux pattern or one 360° cycle of the repeating output signal from sensor 21.

FIGS. 3A, 3B, 3C, and 3D illustrate the light flux of negligible magnitude is received by sensor 21 as the chopper rotates through one cycle when the image is properly focused at 0 in image plane 3.

FIG. 3A shows a condition wherein a bar 29' is centered on the optical axis on the input side of chopper. With an odd number of slots, this positions a slot 27' on the opposite side also centered on the optical axis. With the input and output so limited and utilizing a slit of negligible width, only two single light rays of negligible magnitude are received at two locations as indicated at 21A and 21A';. In FIG. 3B, the chopper 19 has rotated counterclockwise one-half a bar width so that the sidewall of bar 29' is aligned with the optical axis. With the input and output so limited a single light ray is received at 21B. Accordingly, the output of light is as negligible in FIG. 3B as it was in FIG. 3A. In FIG. 3C, the chopper is again rotated one-half a bar width to produce two single light rays at 21C and 21C'. In FIG. 3D, the chopper has again rotated one-half of a bar width. A single ray of light is received at 21D.

Referring now to FIGS. 4 and 5, light flux impinging on sensor 21 is illustrated when the image is focused in an image plane 0', short of the center 0 of the chopper. In this showning, the chopper goes through the same rotational movements illustrated in the FIG. 3 series.

As illustrated in FIG. 4A, the input bar 29' so limits the light passing through the chopper that no light impinges on sensor 21. In FIG. 4B, only a single ray of light impinges on the sensor 21. In FIG. 4C, substantial light impinges on the sensor 21 to provide an output signal.

In FIG. 4D, a single ray of light is received by sensor 21, as in FIG. 3B so as to provide a negligible output.

FIG. 5 is a plot of the light flux variation for an image at 0' as a function of chopper angular positions illustrated in FIGS. 4A, 4B, 4C, and 4D. Theoretically no light passes through the chopper in the 0°–90° range and in the 270°–360° range. This is based on the assumption that the slit image has no width. In fact, it does have some finite width which causes a light flux variation having minimum values at 0° and 360°, as illustrated in FIG. 5.

Referring to FIG. 6 and 7, the light flux impinging on sensor 21 is illustrated when the image is focused in image plane 0'', beyond the center 0 of the chopper while the chopper goes through the same rotational movement illustrated in FIG. 3.

As illustrated, only in FIG. 6A does sensor 21 receive substantial light through the chopper 19.

FIG. 7 is a plot of the light flux variation for an image at 0'' as a function of chopper angular positions illustrated in FIGS. 6A, 6B, 6C and 6D. By comparing FIGS. 5 and 7, it will be noted that a 180° phase shift in output occurs dependent on whether the image focuses short of or beyond 0. Theoretically, in FIGS. 6A, 6B, 6C and 6D, no light passes through the chopper between 90°–270° positions. This again is based on the assumption that the slit image has no width. In fact, it does have some finite width which causes light flux variation having minimum value at 180°, as illustrated in FIG. 7.

Again referring to FIG. 1, the output from sensor 21 is amplified at 41 and sent to a phase sensitive detector at 43. Here the signal is compared with a fixed phase reference signal.

The phase sensitive detector is conventional and may be of the type described in "Theory of Servomechanisms", pages 111–114, by Nicholls et. al, published by McGraw-Hill, 1947.

Detector 43 has a second input for receiving the reference signal. The reference signal is the output from a sensor 45 which is amplified at 49. Sensor 45 receives light through one side of chopper 19. The light impinging on sensor 45 is generated by source 11 and fed by fiber optice 47 into the chopper as shown in FIG. 1.

By receiving light through the chopper 19, the output from sensor 45 provides a reference signal having the same frequency as the output from sensor 21.

Detector 43 compares the outputs from sensors 21 and 45 and provides an output signal having a magnitude and polarity corresponding to the distance and direction the slit image is offset from image plane 3. This signal is fed to an indicator 51 to indicate the direction for corrective action. In the alternative and in addition, the signal may be fed to a servo control 53, and by suitable mechanical linkage 55, the lens 5 can automatically be driven to position of best focus. Alternatively, the mirror 22 may be repositioned to achieve null signal condition.

As an alternative, chopper 19 could be made to oscillate rather than to rotate. By oscillate is meant that the chopper would rotate clockwise through an angle in one direction and then rotate counterclockwise through the same angle in the reverse direction and so forth. By the selection of a proper amplitude such as the angle included in the width of one bar 29 and one space 27, the resulting output signals will be as previously described for the rotating chopper configuration.

Figure 2:
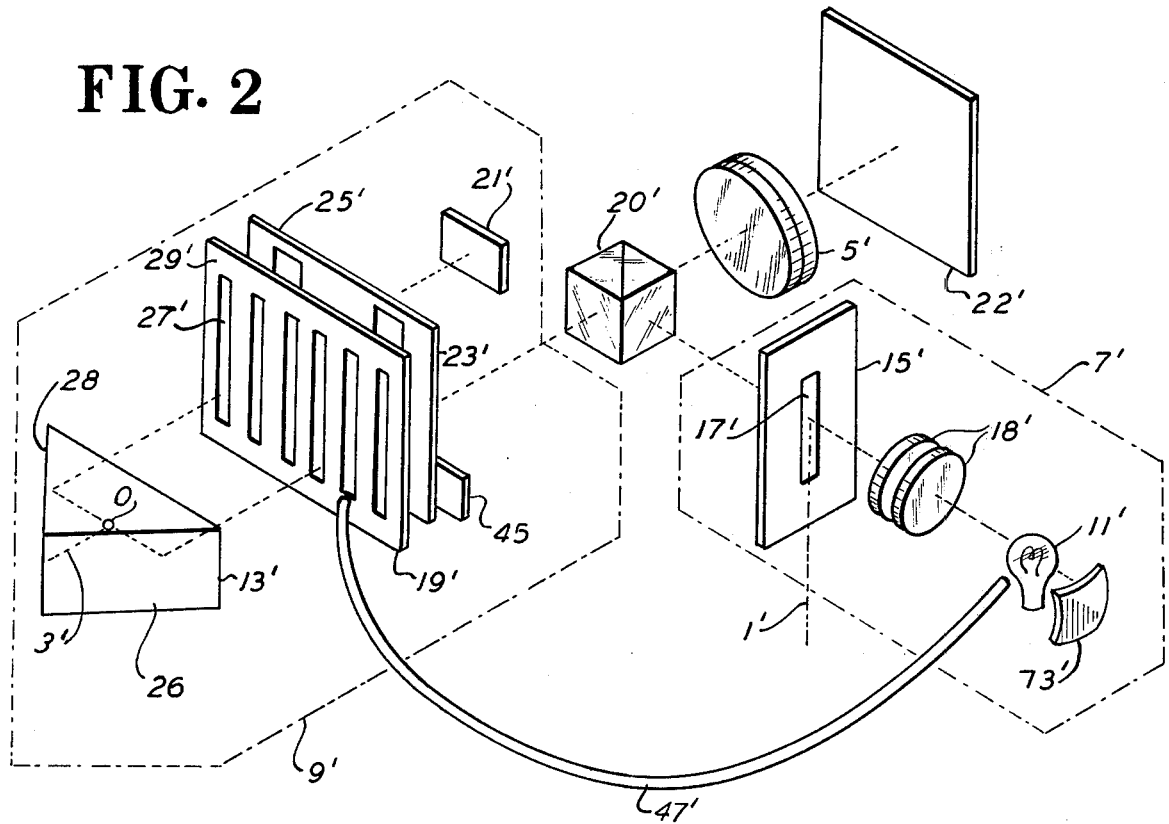
FIG. 2 is a schematic of an alternative mode of the invention of FIG. 1 using an oscillating grid.

Referring to FIG. 2, this illustrates an alternative form of the invention as applied to an optical system. The system includes an object plane 1', the target image plane 30', and a lens 5'. Lens 5' is to be positioned so as to focus an object plane 1' in the image plane 3'.

As in the previous example, in order to properly position lens 5', the present invention includes a transmitter 7' and a receiver 9' which are located in fixed positions relative to the known object and image planes 1' and 3' and are combined in a single unit as before.

Transmitter 7' includes a light source 11', a reflector 13' for the light source, and light shield 15' defining a slit 17'. A condensing lens 18' concentrates light from source 11' on to slit 17'. The light shield 15' is aligned with the known object plane of the optical system (1').

Receiver 9' includes an oscillating grid 19' and a porro prism 13 and photoelectric sensor 21'. The apex of the porro prism lies in the known image plane 3' of the optical system being focused. When lens 5' is properly adjusted, a slit image of the illuminated slit 17 should be at 0 in image plane 3'.

As previously described, when the slit image lies in image plane 3', a flux variation (a variation in light density) of negligible magnitude is received by sensor 21' and a null signal is produced by a signal generating system, hereinafter described, thereby indicating that lens 5' is properly positioned When the slit image lies fore or aft of the central axis 0, e.g. at 0' and O'', then sensor 21' detects a fluctuating light flux with a 180° phase shift corresponding to whether the slit image is fore or aft of 0.

A beam splitter 20' is provided as mentioned with respect to the previous example. The beam splitter directs the light from the light source through the lens 5' and against the mirror. The light reflected back from the mirror travels through the beam splitter, through the oscillating grid in the same manner as the rotating and oscillating chopper of the prior example.

After it passes through the grid, the light beam passes into the porro prism. A porro prism consists of a solid glass isosceles right triangle and is positioned so that the hypotenuse of the triangle is parallel to the oscillating grid, (The prism can be other than isosceles, this results in a more complex configuration). The reflecting surfaces, which are perpendicular to each other, are then positioned at 45° angles with respect to the direction of the light beam passing through the lens and porro prism. A glass of high index of refraction will permit total internal reflection. Alternatively, the two perpendicular surfaces may be coated with a reflecting material.

When the light beam passes into the porro prism, it hits one of the reflecting surfaces 26 and is reflected from that surface upwardly against reflecting surface 28 (the other reflecting surface) of the porro prism. The beam is then reflected out of the prism and after a second pass through the grid, impinges against sensor 21', aforementioned.

For proper operation of the mechanism, the light beam needs to pass through the oscillating grid twice. In the previous embodiment the light beam passed through both sides of the rotating chopper to achieve the same effect.

Light shields 23' and 25' are provided for limiting the angles of convergence to and divergence from the slit image.

Grid 19' comprises a flat member having a plurality of slots 27' and bars 29', the latter extending along the height thereof. As hereinafter explained, the optical axis separation produced by the porro prism is related to the spacing of the bars 29' to produce the phase shift hereinbefore referred to. The bars 29' are of uniform width and slots 27' are of uniform width. Width of slots 27' may equal the width of bars 29' but this is not a requirement.

Again referring to FIG. 2, grid 19' is adapted to be accelerated or vibrated by any conventional drive means at a uniform frequency. The frequency will govern frequency of the pickup by sensor 21' enabling a high frequency input to a servo control.

As hereinbefore described, the output of sensor 21' is phase shifted 180° depending on whether the slit image is located fore, e.g. 0', or aft, e.g. 0" of point 0.

When the slit image is aligned with point 0 at the apex of the porro prism (in image plane 3) a flux variation of negligible magnitude is received by sensor 21'.

In order to illustrate the foregoing phase shift, FIGS. 8, 9 and 10 illustrate a succession of positions of grid 19'. Movement equivalent to the width of one slot and one bar is a half cycle of the repeating light flux pattern or one 360° cycle of the repeating output signal from sensor 21'.

Figure 8A:
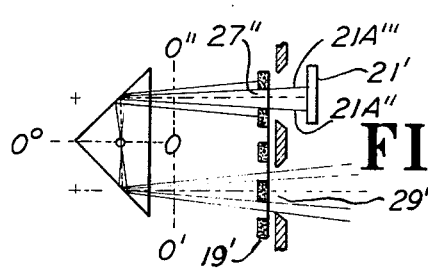
FIGS. 8A, 8B and 8C show the grid of FIG. 2 in successive positions with light passing therethrough when the light image is focused at the null position.
Figure 8B:
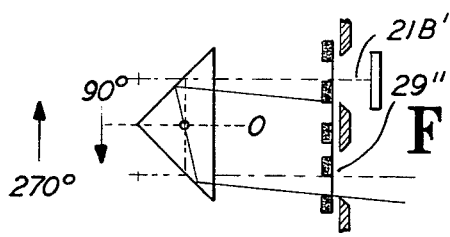
Figure 8C:
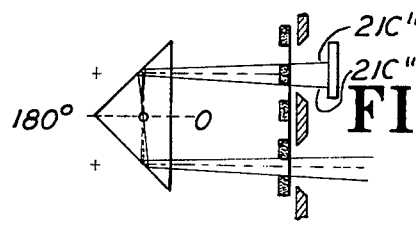

FIGS. 8A, 8B, and 8C illustrate that light flux fluctuation of negligible magnitude is received by sensor 21 if the grid oscillates through one cycle all the way up and all the way down when the image is properly focused at 0 in image plane 3'.

FIG. 8A shows a condition wherein a bar 29" is centered on the optical axis of the input beam, (the lower beam in the figures). This positions a slot 27" in the center of the path of the output beam (the higher beam in the figures). With the input and output so limited, only two single light rays of negligible magnitude are received at two locations as indicated at 21A" and 21A'" where a slit of negligible width is employed. In Figure 8B, and grid 19 has moved a distance of one-half a bar width so that the sidewall of bar 29" is aligned with the optical axis of the input beam. With the input and output so limited, a single light ray is received at 21B'. Accordingly, the output of light is as negligible in FIG. 8B as it was in FIG. 8A. In FIG. 8C, the grid is again moved one-half a bar width to produce two single light rays at 21C" and 21C'". On the return stroke of the grid, position 8B is repeated and the grid motion continues to resume position 8A to complete the reciprocating cycle.

Referring now to FIG. 9, light flux impinging on sensor 21' is illustrated when the image is focues in an image plane 0', before proper plane 0. In this showing, the grid goes through the same reciprocating movements illustrated in the FIG. 8 series.

Figure 9A:
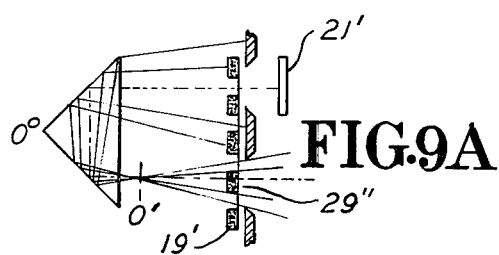
FIGS. 9A, 9B and 9C are views similar to FIGS. 8A, 8B and 8C except that the image is focused short of the null position.
Figure 9B:
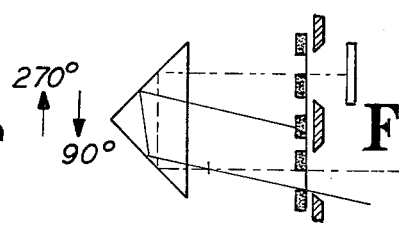
Figure 9C:
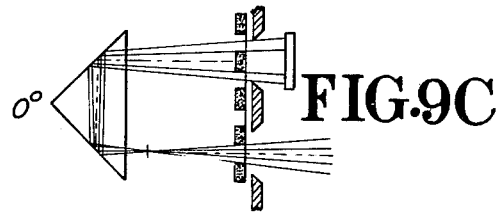

As illustrated in FIG. 9A, the input bar 29" so limits the light passing through the grid that no light impinges on sensor 21 In FIG. 9B, only a single ray of light impinges on the sensor 21'. In FIG. 9C substantial light impinges on the sensor 21' to provide an output signal.

FIG. 5 which is a plot of the light flux variation for an image at 0' as a function of chopper positions illustrated in FIG. 4 also applies equally as well to grid positions shown in FIGS. 9A, 9B, and 9C. Theoretically, no light passes through the grid in the 0°–90° range and in the 270°–360°range. This is based on the assumption that the slit image has no width. In fact, it does have some finite width which causes a light flux variation having minimum values at 0° and 360°, as illustrated in FIG. 4.

Referring to FIG. 10, the light flux impinging on a sensor 21' is illustrated when the image is focused in image plane 0", beyond the point 0 in plane 3 while the grid goes through the same movements illustrated in FIG. 8.

Figure 10A:
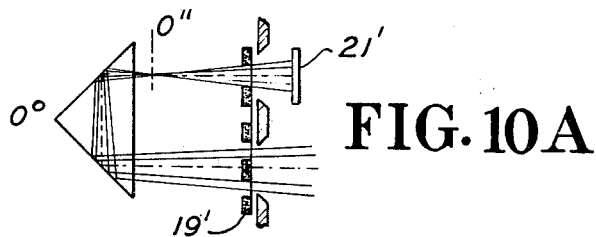
FIGS. 10A, 10B and 10C are views similar to FIGS. 8A, 8B and 8C, except that the image is focused aft of the null position.

As illustrated, only in FIG. 10A does sensor 21' receive substantial light through the grid 19'.

Figure 10B:
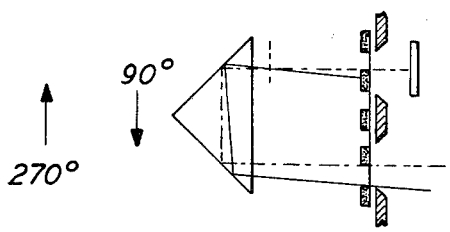
Figure 10C:
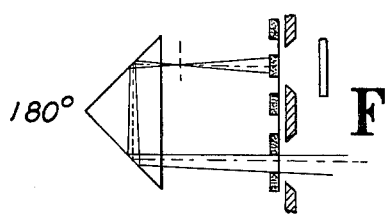

FIG. 6 is a plot of the light flux variation for an image at 0' as a function of grid positions illustrated in FIGS. 10A, 10B and 10C. By comparing FIGS. 4 and 6, it will be noted that a 180° phase shift in output occurs dependent on whether the image focuses short of or beyond 0. Theoretically, in FIGS. 11A, 11B and 11C, no light passes through the chopper between the 90°–270° positions. This again is based on the assumption that the slit image has no width. In fact, it does have some finite width which causes light flux variation having minimum value at 180°, as illustrated in FIG. 6.

The signal generating system from sensor 21' is the same as described with respect to the system on FIG. 1.

Sensor 45', which is the equivalent of sensor 45 in the embodiment of FIG. 1, is placed at the grid adjacent to the sensor light beam and the light impinging on this sensor is generated by the light source 11' and fed by fiber optic 47' to the grid, as shown in FIG. 1.

The remainder of the parts of the system operate exactly as described in the system of FIG. 1.

FIG. 11, illustrates a further alternative mode of the invention. Instead of the beam splitter being provided as in the system of FIGS. 7–12, the transmitter 7' is placed on one side of the lens and the receiver 9' on the other side. The light will pass directly from the transmitter through the lens and into the receiver, and then be reflected out of the receiver, by the porro prism onto sensor 21". The operation of this system outside of the positioning of the receiver and transmitter in the same housing and the lack of a beam splitter is substantially the same as the system of FIGS. 7–10.

It will be appreciated that where a concave mirror is used instead of a lens, image forming light is reflected directly by such a mirror thus eliminating the need for a reflecting surface.

It will be further appreciated that multiple optical elements may be used in the light path instead of merely one or two to achieve various arrangements for testing both the elements and other systems.

While specific embodiments of the invention have been described, it will be appreciated that the invention is not limited thereto; as many modifications may be made by one skilled in the art which falls within the true spirit and scope of the invention.

I claim:

1. A device for determining the position of optimum focus and the focus of an optical member;
light beam transmitter means, for transmitting a beam of light substantially perpendicular to the optical axis of the optical member, having an object plane;
deflection means for deflecting a portion of the beam of light so that it travels along the axis of the optical member and through the optical member;
a mirror positioned along the optical axis for reflecting said portion of light back through the optical member;
receiving means having a target image plane including:
means comprising a grid member having alternating slots and bars, movable in a path substantially transverse to the optical axis of the optical member, to provide an output signal including a repeated fluctuating light flux pattern having a phase corresponding to the focus of the optical member and to the direction of the optical member is displaced from the predetermined point of optimum focus;
said transmitter means being fixed in position with respect to the receiving means and with respect to the object and target image planes of the transmitter and receiving means, and positioned on the same side of the lens as the receiving means.

2. The device as defined by claim 1, wherein said light beam transmitting means and said receiving means are positioned within the same housing.

3. The combination as defined by claim 1, wherein said transmitter means has an optical axis and said receiving means has an optical axis and said axes being positioned at an angle of less than 180° with respect to each other.

4. The device as defined by claim 3 wherein said angle is 90°.

5. The device as defined by claim 1 including, means responsive to the output signal for repositioning said optical member to a point of optimum focus.

6. The combination as defined by claim 5 said receiver means comprising means for providing a variable signal depending on the position of said optical member, means for providing a fixed reference signal stabilized with respect to the remainder of said last mentioned means so as to not require constant calibration, means for comparing said reference and the variable signal to provide said output signal.

7. The combination as defined by claim 1 including a right angular reflecting means said latter means being positioned proximate said oscillating grid to reflect a portion of said light beam which passes through said grid member to cause said portion of the beam to travel back through said grid.

8. The device of claim 1 wherein said deflection means comprises a beam splitter.

9. The combination as defined by claim 8 wherein said means comprising a grid member having slots and bars movable in a path oscillates across a path and wherein said receiving means includes a right angular reflecting means, said latter means is positioned proximate said oscillating grid to reflect said portion of the beam of light which is emitted from said transmitting means and subsequently passes through said grid to cause the beam to travel back through said grid.

10. The device of claim 1 wherein the member having slots and bars comprises an oscillating grid.

11. The device of claim 1 wherein the member having slots and bars comprises a rotating chopper.

12. The device of claim 1 wherein the light beam after passing through the lens, passes through the means comprising a member having slots and bars twice in forming an output signal.

13. The combination comprising optical means for focusing an image and means for providing an output signal indicating the direction the optical means is displaced from a point of optimum focus, said means for providing an output signal comprising an oscillating grid for providing a repeated fluctuating light flux pattern having a phase corresponding to the focus of the optical means and to the direction the optical means is displaced from said predetermined point of optimum focus, said grid comprising a flat member having a number of slots and bars thereon.

* * * * *

UNITED STATES PATENT OFFICE
CERTIFICATE OF CORRECTION

Patent No. 3,917,409                Dated 11/04/75

Inventor(s) Paul T. Kaestner

It is certified that error appears in the above-identified patent and that said Letters Patent are hereby corrected as shown below:

Column 1, line 65, after "fore" "of" should read -or-.

Column 6, line 31, "30'" should read -3'-.

Column 8, line 10, "focuses" should read -- focused --.

Column 8, line 48, "of" should read -in-.

Signed and Sealed this second Day of March 1976

[SEAL]

Attest:

RUTH C. MASON
*Attesting Officer*

C. MARSHALL DANN
*Commissioner of Patents and Trademarks*